(12) United States Patent
Tachigi et al.

(10) Patent No.: US 9,804,819 B2
(45) Date of Patent: Oct. 31, 2017

(54) RECEIVING APPARATUS AND CONTROL METHOD

(71) Applicant: JVC KENWOOD Corporation, Yokohama-shi, Kanagawa (JP)

(72) Inventors: Kazuomi Tachigi, Yokohama (JP); Kanji Kuroiwa, Yokohama (JP); Hiroshi Nakamura, Yokohama (JP)

(73) Assignee: JVC KENWOOD Corporation, Kanagawa (JP)

( * ) Notice: Subject to any disclaimer, the term of this patent is extended or adjusted under 35 U.S.C. 154(b) by 0 days.

(21) Appl. No.: 15/366,261

(22) Filed: Dec. 1, 2016

(65) Prior Publication Data

US 2017/0161013 A1    Jun. 8, 2017

(30) Foreign Application Priority Data

Dec. 7, 2015  (JP) ................. 2015-238210

(51) Int. Cl.
*G06F 3/16*  (2006.01)
*H04R 3/00*  (2006.01)

(52) U.S. Cl.
CPC ............. *G06F 3/165* (2013.01); *H04R 3/007* (2013.01); *H04R 2430/01* (2013.01)

(58) Field of Classification Search
CPC ....... H04N 21/26258; H04N 21/41407; H04N 21/42222; H04N 21/4825; H04N 21/8113; H04N 21/233; H04N 21/4222; H04N 21/42224; H04N 21/4227; H04N 21/42684; H04N 21/431; H04N 21/4312; H04N 21/4333
See application file for complete search history.

(56) References Cited

FOREIGN PATENT DOCUMENTS

JP    09-130173    5/1997

*Primary Examiner* — Mohammad Islam
(74) *Attorney, Agent, or Firm* — Amin, Turocy & Watson LLP (57) ABSTRACT

A receiving apparatus comprises an audio output unit, a volume operating unit outputting an operating value indicating a volume level of the audio according to a user operation, a lock controller switching between a non-locked state in which the volume level of the audio can be varied and a locked state in which the volume level is fixed, and a volume controller causing the audio output unit to output the audio having a volume level corresponding to the operating value in the non-locked state and the audio having a volume level corresponding to the lock value in the locked state, and switching the locked state to the non-locked state for a period of time on turning on a predetermined operating part and updating the lock value with the operating value, and switching the non-locked state to the locked state on turning off the predetermined operating part.

8 Claims, 5 Drawing Sheets

RECEIVING APPARATUS AND CONTROL METHOD

CROSS-REFERENCE TO RELATED APPLICATION

The present application claims priority to and incorporates by reference the entire contents of Japanese Patent Application No. 2015-238210 filed in Japan on Dec. 7, 2015.

FIELD

The present disclosure relates to a receiving apparatus and a control method.

BACKGROUND

A Portable transceiver typically has a volume lock function that locks audio volume. Such a transceiver can avoid a sudden output of audio with an unexpectedly high volume level, for example, when a volume key is inadvertently operated.

Japanese Patent Application Laid-open No. JPH09130173 discloses an apparatus that automatically returns a volume key that has been inadvertently operated to a position at any given point in time.

The known transceiver requires that, to set the volume again after the volume has been locked, the locked state be canceled and then the volume key be operated to thereby set the locked state. Thus, the known transceiver requires complicated operations for setting again the volume to be locked. Additionally, when the volume key is inadvertently operated in the locked state, the known transceiver outputs audio at an unintentional volume level as soon as the locked state is canceled. Thus, when the volume is reset after the volume has been locked in the known transceiver, audio at an unintentional volume level will be output as soon as the locked state has been canceled.

SUMMARY

It is an object of the present disclosure to at least partially solve the problems in the conventional technology.

According to one aspect, there is provided a receiving apparatus comprising an audio output unit configured to output audio corresponding to an audio signal, a volume operating unit configured to output an operating value indicating a volume level of the audio according to a user operation, a lock controller configured to switch between a non-locked state in which the volume level of the audio can be varied based on the operating value and a locked state in which the volume level of the audio is fixed by a constant lock value for the operating value, and a volume controller configured to cause the audio output unit to output the audio having a volume level corresponding to the operating value in the non-locked state and to cause the audio output unit to output the audio having a volume level corresponding to the lock value in the locked state, wherein the lock controller is further configured to switch, when a predetermined operating part is turned on in the locked state, the locked state to the non-locked state for a period of time that starts when the operating value becomes a value that falls within a predetermined range based on the lock value and ends when the predetermined operating part is turned off, and to update the lock value with the operating value and switch the non-locked state to the locked state when the predetermined operating part is turned off after having switched to the non-locked state.

According to one aspect, there is provided a control method for a receiving apparatus, the receiving apparatus comprising an audio output unit configured to output audio corresponding to an audio signal, a volume operating unit configured to output an operating value indicating a volume level of the audio according to a user operation, and a volume controller configured to cause the audio output unit to output the audio having a volume level corresponding to the operating value in a non-locked state in which the volume level of the audio can be varied based on the operating value and to cause the audio output unit to output the audio having a volume level corresponding to the lock value in a locked state in which the volume level of the audio is fixed by a constant lock value for the operating value, the control method comprising, when a predetermined operating part is turned on in the locked state, switching the locked state to the non-locked state for a period of time that starts when the operating value becomes a value that falls within a predetermined range based on the lock value and ends when the predetermined operating part is turned off, and when the predetermined operating part is turned off after having switched to the non-locked state, updating the lock value with the operating value and switching the non-locked state to the locked state.

The above and other objects, features, advantages and technical and industrial significance of this disclosure will be better understood by reading the following detailed description of presently preferred embodiments of the disclosure, when considered in connection with the accompanying drawings.

DETAILED DESCRIPTION OF THE PREFERRED EMBODIMENTS

Figure 1:
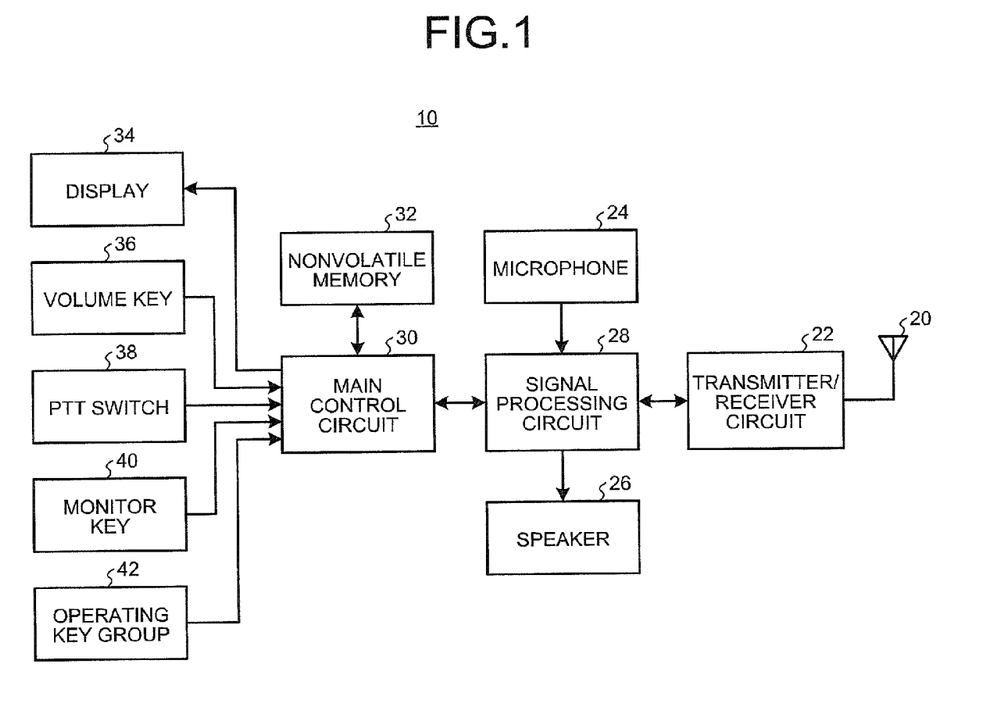
FIG. 1 is a diagram illustrating a hardware configuration of a transceiver according to an embodiment.

FIG. 1 is a diagram illustrating a hardware configuration of a transceiver 10 according to an embodiment. The transceiver 10 has functions of a transmitting apparatus that wirelessly transmits an audio signal and a receiving apparatus that wirelessly receives an audio signal.

The transceiver 10 includes an antenna 20, a transmitter/receiver circuit 22, a microphone 24, a speaker 26, a signal processing circuit 28, a main control circuit 30, a nonvolatile memory 32, a display 34, a volume key 36, a push to talk (PTT) switch 38, a monitor key 40, and an operating key group 42.

The antenna 20 emits electromagnetic waves in the air and acquires the electromagnetic waves in the air. The transmitter/receiver circuit 22 acquires, during transmitting the electromagnetic waves, a modulation signal from the signal processing circuit 28 and modulates a carrier wave with the acquired modulation signal to thereby generate a modulated signal, specifically, a transmission signal. During transmitting the electromagnetic waves, the transmitter/receiver circuit 22 transmits the transmission signal to another apparatus (another transceiver 10), a base station, or the like via the antenna 20. During receiving the electromagnetic waves, the transmitter/receiver circuit 22 receives a modulated signal from another apparatus, a base station, or the like via the antenna 20. The transmitter/receiver circuit 22 then demodulates the received modulated signal, specifically, a reception signal to thereby generate a demodulation signal. The transmitter/receiver circuit 22 applies the demodulation signal to the signal processing circuit 28 during receiving the electromagnetic waves.

The microphone 24 collects ambient sound. The microphone 24 converts the ambient sound to a corresponding electric signal to thereby output an audio signal. The speaker 26 converts the audio signal to vibration to thereby emit sound to the outside.

The signal processing circuit 28 performs a predetermined process, such as bandwidth limiting process, for the audio signal output from the microphone 24 to thereby generate a modulation signal during transmitting the electromagnetic waves. The signal processing circuit 28 applies the generated modulation signal to the transmitter/receiver circuit 22. During receiving the electromagnetic waves, the signal processing circuit 28 performs, for example, a bandwidth limiting process for the demodulation signal output from the transmitter/receiver circuit 22 to thereby extract an audio signal. The signal processing circuit 28 applies the extracted audio signal to the speaker 26. It is noted that the signal processing circuit 28 may include an AD/DA converter circuit to perform digital signal processing or may perform analog signal processing.

The main control circuit 30 controls the transceiver 10 totally. The main control circuit 30 includes, for example, a central processing unit (CPU), a read only memory (ROM), and a random access memory (RAM). The main control circuit 30 executes a previously installed program to thereby control different elements including the signal processing circuit 28. The nonvolatile memory 32 may, for example, be a flash memory. The nonvolatile memory 32 stores the program executed by the main control circuit 30 and various types of setting values used for transmission and reception.

The display 34 is disposed on, for example, a main surface of a cabinet and displays information for a user. The main control circuit 30 controls the display 34 so as to display various types of information on the display 34.

The volume key 36 is a part that can be operated by the user to vary a volume level of audio output during receiving the electromagnetic waves. The volume key 36 is a mechanical operating part disposed in the cabinet. The volume key 36 may, for example, be a rotary variable resistor in which the position of a rotary shaft represents the volume level. The main control circuit 30 applies voltage to the volume key 36 and detects through AD conversion a voltage value corresponding to an angular position. The main control circuit 30 acquires the detected voltage value as an operating value corresponding to the angular position of the volume key 36.

The PTT switch 38 switches between transmission and reception. The PTT switch 38 is a momentary switch that is turned on, for example, when the user depresses the switch and turned off when the user releases the switch. The main control circuit 30 performs a transmission process when the PTT switch 38 is on and a reception process when the PTT switch 38 is off.

The monitor key 40 cancels a squelch function that will be described later. The monitor key 40 is a momentary switch that is turned on, for example, when the user depresses the switch and turned off when the user releases the switch. The squelch function stops, during receiving the electromagnetic waves, the output of an audio signal when an effective reception signal is not included in a received signal and outputs the audio signal when the effective reception signal is included in the received signal. The monitor key 40 can be turned on even when the effective reception signal is not included during receiving the electromagnetic waves, to thereby allow the audio signal to be output from the speaker 26.

The operating key group 42 includes a plurality of keys for operating the transceiver 10. The operating key group 42 includes, for example, a power button, a channel selector switch, and a state changeover switch. The main control circuit 30 detects an operation performed on the operating key group 42 to thereby control the transceiver 10.

Figure 2:
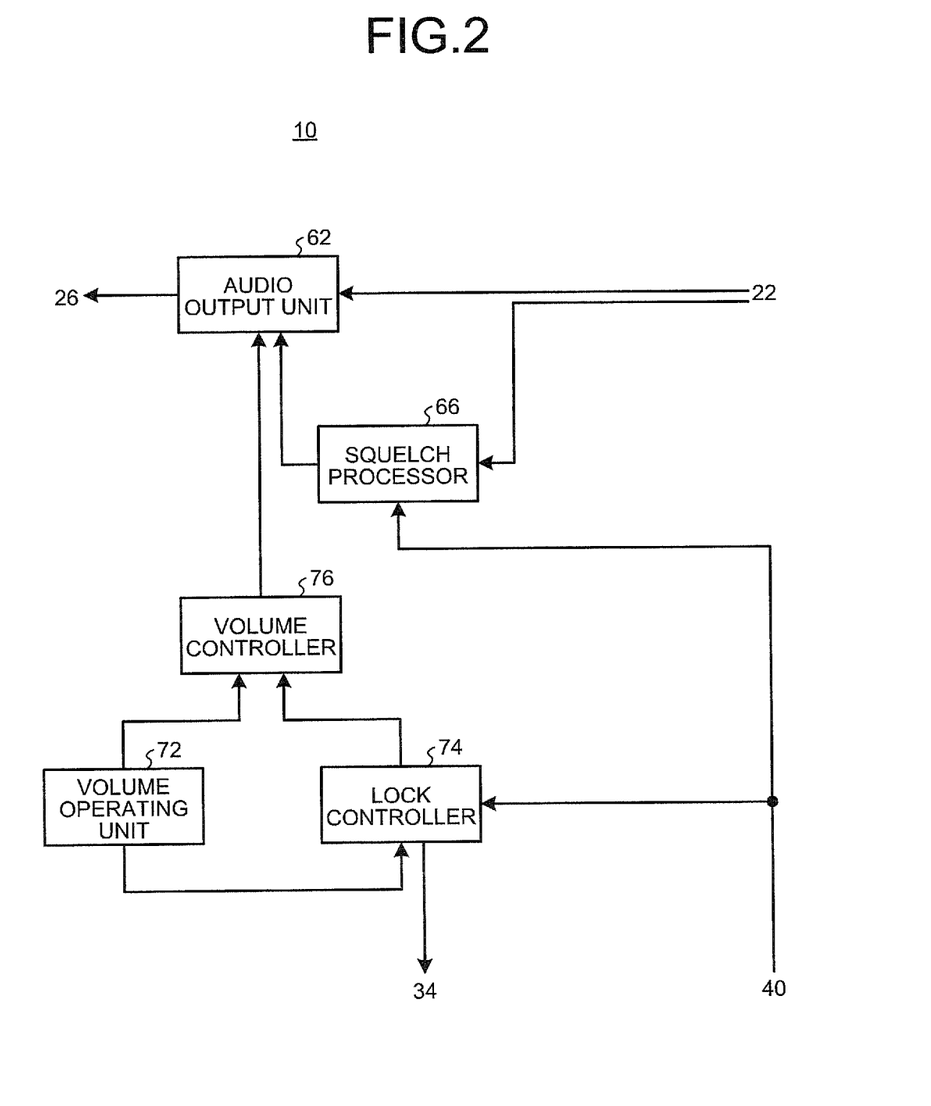
FIG. 2 is a diagram illustrating a functional configuration for an audio output by the transceiver according to the embodiment.

FIG. 2 is a diagram illustrating a functional configuration for an audio output by the transceiver 10 according to the embodiment. The transceiver 10 includes an audio output unit 62, a squelch processor 66, a volume operating unit 72, a lock controller 74, and a volume controller 76.

The audio output unit 62 receives a demodulation signal output from the transmitter/receiver circuit 22. The audio output unit 62 extracts an audio signal from the demodulation signal and applies the extracted audio signal to the speaker 26. The audio output unit 62 is achieved by the signal processing circuit 28.

The squelch processor 66 performs the squelch function. Two techniques are available to achieve the squelch function. The first technique is referred to as noise squelch that detects noise outside a demodulation bandwidth and stops the output of the demodulation signal when the noise is equal to or higher than a predetermined level. The first technique also reduces noise outside the demodulation bandwidth when the noise is equal to or higher than the predetermined level. Thus the first technique enables the output of the demodulation signal when it detects that the noise level is reduced. The second technique is referred to as tone squelch or code squelch. The second technique modulates the modulation signal with a control signal, such as a predetermined tone signal or digital code signal. When such a control signal is detected, the second technique enables the output of the demodulation signal. The second technique stops the output of the demodulation signal when the predetermined tone or code control signal is not detected from the reception signal.

Specifically, when the reception signal is equal to or lower than the predetermined level or the reception signal contains no control signal by which the squelch function is canceled, the squelch processor 66 stops the output of audio by the audio output unit 62. The squelch processor 66 may take any approach to determine whether the reception signal contains a control signal by which the squelch is canceled. The squelch processor 66 can stops the output of white noise during silence or demodulated audio of an unnecessary signal as described above.

In addition, the squelch processor 66 cancels the squelch function in accordance with an operation performed by the user. Specifically, the squelch processor 66 causes the audio output unit 62 to output audio in accordance with the operation performed by the user regardless of whether the reception signal is present or the reception signal contains a control signal. For example, the squelch processor 66 cancels the squelch function when the monitor key 40 is turned on. Thus, when the monitor key 40 is turned on, the transceiver 10 can output audio such as white noise and adjust a volume level of the audio even when no reception signal is present. The squelch processor 66 is achieved by the signal processing circuit 28 and the main control circuit 30.

The volume operating unit 72 outputs an operating value that indicates the volume level of audio in accordance with the operation performed by the user. For example, the volume operating unit 72 is achieved by the volume key 36 and the main control circuit 30. When the volume key 36 is a rotary variable resistor having three terminals, for example, a predetermined voltage is applied across a resistor in the volume key 36. The main control circuit 30 detects, through analog-to-digital conversion, voltage at a movable terminal in the volume key 36 and, on the basis of the detected voltage, detects a value corresponding to the angular position of the volume key 36. The main control circuit 30 then outputs the value corresponding to the detected angular position as the operating value.

The lock controller 74 switches between a non-locked state and a locked state in accordance with the operation performed by the user. In the non-locked state, the volume level of audio can be varied according to the operating value output by the volume controller 76. In the locked state, the volume level of audio is fixed at a constant level. For example, the lock controller 74 changes the state from the non-locked state to the locked state, or vice versa, depending on the operation performed on the operating key group 42.

The volume controller 76 controls the volume level of audio output from the audio output unit 62. More specifically, in the non-locked state, the volume controller 76 causes the audio output unit 62 to output audio having the volume level corresponding to the operating value output by the volume operating unit 72. Specifically, in the non-locked state, the volume controller 76 varies the volume level of audio in accordance with the operating value of the volume operating unit 72. In the locked state, the volume controller 76 causes the audio output unit 62 to output audio having the volume level indicated by a lock value registered in the lock controller 74. Specifically, in the locked state, the volume controller 76 fixes the volume level of audio regardless of the operating value output by the volume operating unit 72.

The lock controller 74 registers the lock value that indicates the volume level of audio to be output in the locked state. Specifically, when the non-locked state is switched to the locked state in accordance with the operation performed by the user, the lock controller 74 registers the operating value of the volume operating unit 72 at the switching operation as the lock value.

The lock controller 74 can register any operating value output by the volume operating unit 72 as the lock value. For example, the lock controller 74 can register any operating value that ranges from an operating value representing mute to an operating value representing a maximum volume level as the lock value. Thus, in the locked state, the volume controller 76 can fix audio at mute or at the maximum volume level.

Additionally, the lock controller 74 updates a registered lock value when the user performs an operation through a predetermined procedure in the locked state. Specifically, the lock value is updated through the following procedure.

When a predetermined operating part is turned on in the locked state, the lock controller 74 maintains the locked state for a period of time that starts when the predetermined operating part is turned on and ends when the operating value output by the volume operating unit 72 becomes a value that falls within a predetermined range based on the lock value. In this case, the lock controller 74 may display, on the display 34, information indicating the locked state for the period of time that starts when the predetermined operating part is turned on and ends when the operating value becomes a value that falls within the predetermined range based on the lock value.

The lock controller 74 switches from the locked state to the non-locked state during a period of time that starts when the operating value becomes a value that falls within the predetermined range based on the lock value and ends when the predetermined operating part is turned off. It should be noted that, if the operating value is a value that falls within the predetermined range based on the lock value when the predetermined operating part is turned on in the locked state, the locked state is switched to the non-locked state when the predetermined operating part is turned on.

When the predetermined operating part is turned off after the locked state has been switched to the non-locked state, the lock controller 74 updates the lock value with the operating value output by the volume operating unit 72 at the time at which the predetermined operating part is turned off, and switches to the locked state. Thus the lock controller 74 can update the lock value.

It is here noted that the predetermined operating part is the monitor key 40 in the present example. Thus, when the monitor key 40 is turned on and under a condition in which the audio output unit 62 outputs audio regardless of whether the reception signal contains an effective audio signal, the lock controller 74 changes the lock value. Thereby the effective audio can be output when the reception signal is present and white noise can be output even when the reception signal is not present. Thus the lock controller 74 can allow the user to reset the volume level to be fixed while checking the volume level of audio.

Figure 3:
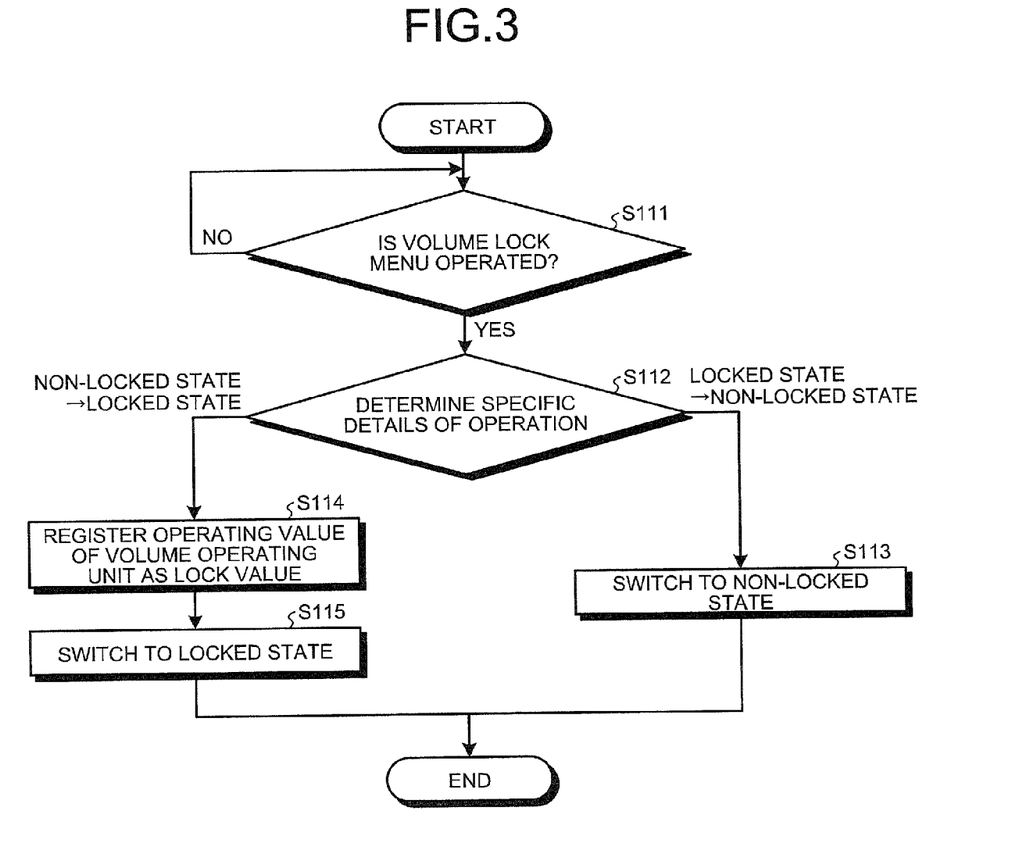
FIG. 3 is a flowchart illustrating a process for switching between a non-locked state and a locked state.

FIG. 3 is a flowchart illustrating a process for switching between the non-locked state and the locked state. To switch between the non-locked state and the locked state, the lock controller 74 performs the process illustrated in the flowchart of FIG. 3.

At Step S111, the lock controller 74 determines whether the user operates the operating key group 42 and operates a volume lock menu that serves as a user interface for changing a volume lock setting. If it is determined that the volume lock menu has not been operated (No at S111), the lock controller 74 waits at Step S111. If it is determined that the volume lock menu has been operated (Yes at S111), the lock controller 74 proceeds to Step S112.

At Step S112, the lock controller 74 determines specific details of the operation. If it is determined at Step S112 that the operation performed was to switch from the locked state to the non-locked state, the lock controller 74 performs Step S113. At Step S113, the lock controller 74 switches from the locked state to the non-locked state. For example, the lock controller 74 changes the value of a predetermined flag that indicates the locked state from 1 to 0. After completing Step S113, the lock controller 74 completes the process.

If it is determined at Step S112 that the operation performed was to switch from the non-locked state to the locked state, the lock controller 74 performs Step S114. At Step S114, the lock controller 74 acquires an operating value output by the volume operating unit 72 and registers the acquired operating value as a lock value. For example, the lock controller 74 stores the operating value in a predetermined storage space. Then, at Step S115, the lock controller 74 switches from the non-locked state to the locked state. For example, the lock controller 74 changes the value of the predetermined flag that indicates the locked state from 0 to 1. After completing Step S115, the lock controller 74 completes the process.

As described above, the lock controller 74 can switch between the non-locked state and the locked state in accordance with the operation performed by the user. In addition, when the locked state is switched from the non-locked state to the locked state in accordance with the operation performed by the user, the lock controller 74 can register the operating value of the volume operating unit 72 at the switching operation as the lock value.

Figure 4:
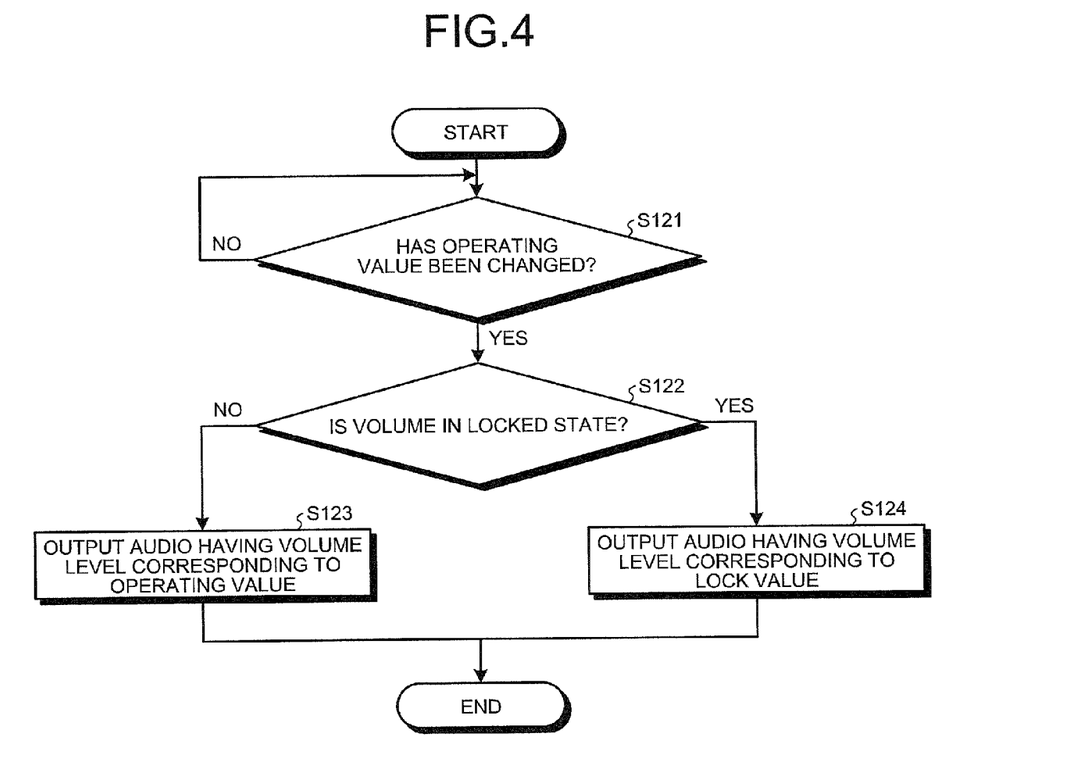
FIG. 4 is a flowchart illustrating a process performed when a volume operating unit is operated.

FIG. 4 is a flowchart illustrating a process performed when the volume operating unit 72 is operated. When the volume operating unit 72 is operated, the volume controller 76 performs the process illustrated in the flowchart of FIG. 4.

At Step S121, the volume controller 76 determines whether the volume operating unit 72 has been operated to thereby change the operating value output from the volume operating unit 72. If it is determined that the operating value has not been changed (No at Step S121), the volume controller 76 waits at Step S121. If it is determined that the operating value has been changed (Yes at Step S121), the volume controller 76 proceeds to Step S122.

At Step S122, the volume controller 76 determines whether the volume is in the locked state. For example, the volume controller 76 determines whether the value of the predetermined flag that indicates the locked state is 1.

If it is determined that the volume is not in the locked state (No at Step S122), in other words, that the volume is in the non-locked state, the volume controller 76 proceeds to Step S123. At Step S123, the volume controller 76 causes the audio output unit 62 to output audio having the volume level corresponding to the operating value output by the volume operating unit 72. For example, the volume controller 76 sets an operating value in the audio output unit 62 to thereby vary an amplification factor of the volume level at the audio output unit 62. After completing Step S 123, the volume controller 76 completes the process.

If it is determined that the volume is in the locked state (Yes at Step S122), the volume controller 76 proceeds to Step S124. At Step S124, the volume controller 76 causes the audio output unit 62 to output audio having the volume level corresponding to the lock value registered by the lock controller 74. For example, the volume controller 76 reads the lock value from the predetermined storage space and sets the read lock value in the audio output unit 62 to thereby set the amplification factor of the volume level for the audio output unit 62. After completing Step S124, the volume controller 76 completes the process.

As described above, in the non-locked state, the volume controller 76 can cause the audio output unit 62 to output audio having the volume level corresponding to the operating value output by the volume operating unit 72. Specifically, in the non-locked state, the volume controller 76 can vary the volume level of the output audio in accordance with the operation performed on the volume operating unit 72 by the user.

In the locked state, the volume controller 76 can cause the audio output unit 62 to output audio having the volume level indicated by the registered lock value. Specifically, in the locked state, the volume controller 76 can fix the volume level corresponding to the registered lock value for the audio to be output even when the user operates the volume operating unit 72.

Figure 5:
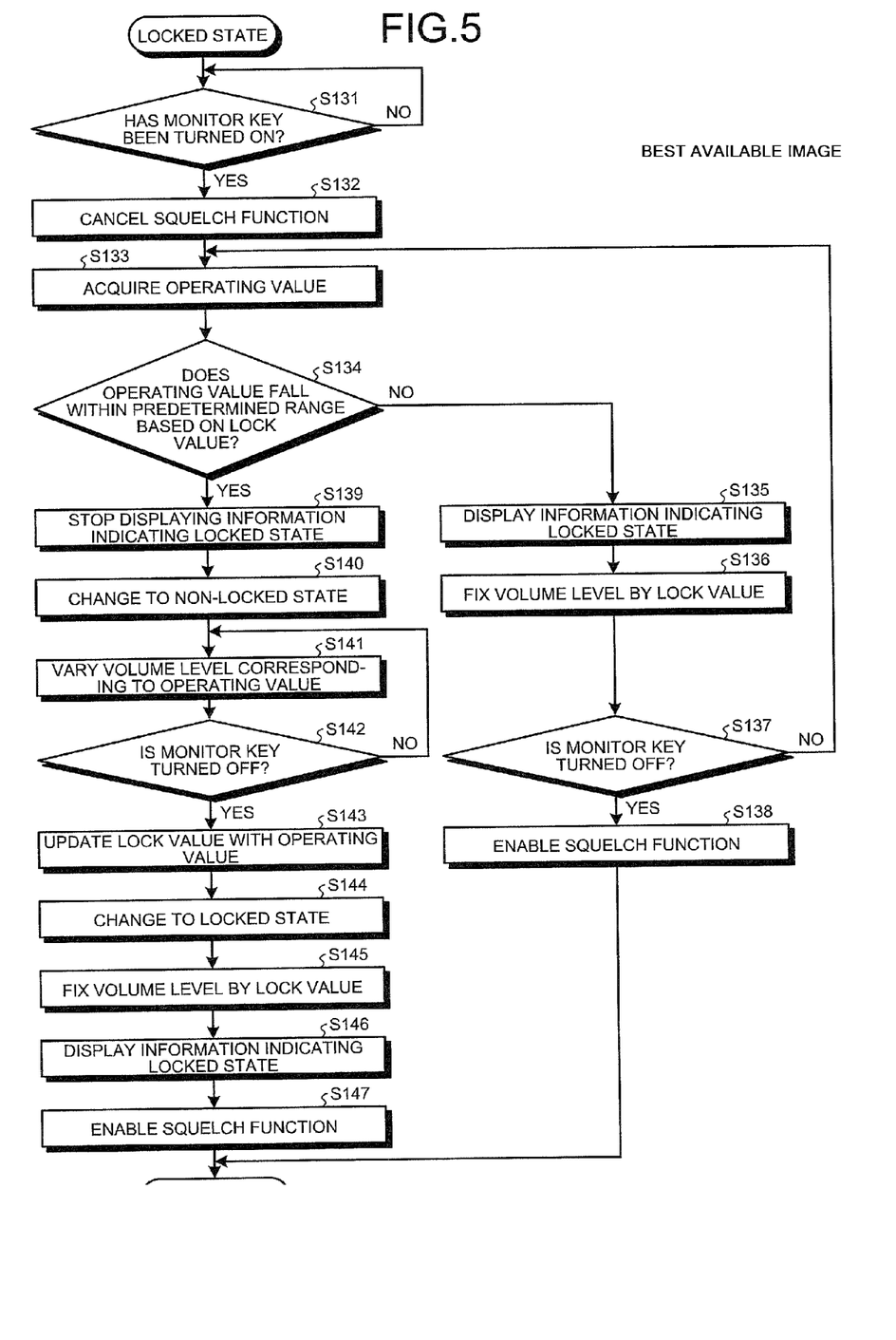
FIG. 5 is a flowchart illustrating a process performed to change a lock value.

FIG. 5 is a flowchart illustrating a process performed to change the lock value. To change a previously registered lock value in the locked state, the squelch processor 66 and the lock controller 74 perform the process illustrated in the flowchart of FIG. 5.

At Step S131, the squelch processor 66 and the lock controller 74 determine whether the monitor key 40 has been turned on. If it is determined that the monitor key 40 has not been turned on (No at Step S131), the squelch processor 66 and the lock controller 74 wait at Step S131. If it is determined that the monitor key 40 has been turned on (Yes at Step S131), the squelch processor 66 and the lock controller 74 proceeds to Step S132.

At Step S132, the squelch processor 66 cancels the squelch function. The cancellation allows the audio output unit 62 to output audio regardless of whether the reception signal contains an effective audio signal. Thus, the user can later vary the lock value, while checking the volume level including white noise. It is noted that the volume is in the locked state at Step S132 and thus the audio output unit 62 outputs audio having the volume level corresponding to the lock value registered by the lock controller 74.

At Step S133, the lock controller 74 acquires the operating value output by the volume operating unit 72. At Step S134, the lock controller 74 determines whether the acquired operating value is a value that falls within a predetermined range based on the registered lock value. The predetermined range based on the lock value ranges, for example, from a lock value obtained by subtracting a predetermined first value from the lock value to a lock value obtained by adding a predetermined second value to the lock value. More specifically, the predetermined range based on the lock value ranges, for example, from a value of 95% of the lock value to a value of 105% of the lock value. The predetermined range based on the lock value may even be a range covering values smaller than the lock value.

At Step S134, if it is determined that the operating value does not fall within the predetermined range based on the lock value (No at Step S134), the lock controller 74 proceeds to Step S135. At Step S135, the lock controller 74 displays information indicating the locked state on the display 34. Then at Step S136, the lock controller 74 maintains the locked state. The maintaining of the locked state enables the volume controller 76 to fix the volume level of audio to be output from the audio output unit 62 by the currently registered lock value.

At Step S137, the squelch processor 66 and the lock controller 74 determine whether the monitor key 40 has been turned off. If it is determined that the monitor key 40 has not been turned off (No at Step S137), specifically, if the monitor key 40 is kept on, the squelch processor 66 and the lock controller 74 return the process to Step S133 and repeat steps from Step S133 to Step S137.

The process of repeating steps from Step S133 to Step S137 allows the lock controller 74 to maintain the locked state for a period of time that starts when the monitor key 40 is turned on and ends when the operating value output by the volume operating unit 72 becomes a value that falls within the predetermined range based on the lock value. Thus, the lock controller 74 can maintain the locked state even when the volume operating unit 72 is operated by the user, unless the operating value becomes a value that falls within the predetermined range based on the lock value. A situation in which a high volume level of audio is suddenly output can thus be eliminated. Furthermore, for the period of time that starts when the monitor key 40 is turned on and ends when the operating value becomes a value that falls within the predetermined range based on the lock value, the lock controller 74 can display on the display 34 the information indicating the locked state. Thereby the lock controller 74 can inform the user that an operation of the volume operating unit 72 does not result in the volume level being varied.

If it is determined that the monitor key 40 has been turned off (Yes at Step S137), the squelch processor 66 proceeds to Step S138. At Step S138, the squelch processor 66 enables the squelch function. These steps allow the lock controller 74 to terminate the process for changing the lock value without changing the lock value. After completing Step 138, the squelch processor 66 and the lock controller 74 completes the process.

If it is determined that the operating value is a value that falls within the predetermined range based on the lock value (Yes at Step S134), the lock controller 74 proceeds to Step S139. At Step S139, the lock controller 74 stops displaying the information indicating the locked state, if the information has been displayed on the display 34. Then, at Step S140, the lock controller 74 changes the locked state to the non-locked state.

Then, at Step S141, the volume controller 76 varies the volume level of audio to be output from the audio output unit 62 corresponding to the operating value output by the volume operating unit 72. Then at Step S142, the squelch processor 66 and the lock controller 74 determine whether the monitor key 40 has been turned off. If it is determined that the monitor key 40 has not been turned off (No at Step S142), specifically, whether the monitor key 40 is kept on, the squelch processor 66 and the lock controller 74 return to Step S141 and repeat Step S141 and Step S142.

The performance of steps from Step S141 to Step S142 allows the lock controller 74 to maintain the non-locked state for a period of time that starts when the operating value becomes a value that falls within the predetermined range based on the lock value and ends when the monitor key 40 is turned off, to thereby enable the volume level of audio output from the audio output unit 62 to be continuously varied corresponding to the operating value output by the volume operating unit 72. As such, the lock controller 74 can output audio having the volume level corresponding to the operation performed by the user on the volume operating unit 72 after the operating value becomes a value that falls within the predetermined range based on the lock value.

If it is determined that the monitor key 40 has been turned off (Yes at Step S142), the lock controller 74 proceeds to Step S143. At Step S143, the lock controller 74 registers the operating value that is currently output by the volume operating unit 72 as the lock value. Then at Step S144, the lock controller 74 changes the non-locked state to the locked state. Then at Step S145, the volume controller 76 fixes the volume level of audio output from the audio output unit 62 by the volume level indicated by the lock value. Then at Step S146, the lock controller 74 displays on the display 34 the information indicating the locked state.

The performance of steps from Step S143 to Step S146 allows, when the monitor key 40 is turned off after the locked state has been changed to the non-locked state, the lock controller 74 to update the lock value with the operating value output by the volume operating unit 72 at a time when the monitor key 40 is turned off, to thereby change the non-locked state to the locked state. Thereby the lock controller 74 can easily change the lock value.

At Step S147, the squelch processor 66 enables the squelch function. After completing Step S147, the squelch processor 66 and the lock controller 74 completes the process.

As described above, when the predetermined operating part is turned on in the locked state, the transceiver 10 according to the embodiment maintains the locked state for the period of time that starts when the predetermined operating part is turned on and ends when the operating value output by the volume operating unit 72 becomes a value that falls within the predetermined range based on the lock value. Thus, the transceiver 10 maintains the locked state even when the volume operating unit 72 is operated by the user, unless the operating value becomes a value that falls within the predetermined range based on the lock value, so that the transceiver 10 can eliminate a situation in which a high volume level of audio is suddenly output.

Additionally, the transceiver 10 according to the embodiment maintains the non-locked state for the period of time that starts when the operating value becomes a value that falls within the predetermined range based on the lock value and ends when the predetermined operating part is turned off. Thereby, the transceiver 10 can output audio having the volume level corresponding to the operation performed by the user on the volume operating unit 72 after the operating value becomes a value that falls within the predetermined range based on the lock value. Thus, the transceiver 10 can allow the user to set the volume level depending on conditions of a surrounding environment, while checking the volume level at the same time.

When the predetermined operating part is turned off, the transceiver 10 updates the lock value with the operating value at the time and changes from the non-locked state to the locked state. The transceiver 10 can thus change the lock value easily.

The present disclosure has been made in view of the foregoing situation and it is an object of the present disclosure to provide a receiving apparatus and a control method that enable reset of volume through a simple operation after the volume has been locked and that prevent audio with an unintentionally high volume level from being output on resetting the volume.

The present disclosure enables resetting of volume in the locked state in which the volume level of audio is fixed at a constant level.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A receiving apparatus, comprising:
an audio output unit configured to output audio corresponding to an audio signal;
a volume operating unit configured to output an operating value indicating a volume level of the audio according to a user operation;
a lock controller configured to switch between a non-locked state in which the volume level of the audio can be varied based on the operating value and a locked state in which the volume level of the audio is fixed by a constant lock value for the operating value; and
a volume controller configured to cause the audio output unit to output the audio having a volume level corresponding to the operating value in the non-locked state and to cause the audio output unit to output the audio having a volume level corresponding to the lock value in the locked state, wherein
the lock controller is further configured
to switch, when a predetermined operating part is turned on in the locked state, the locked state to the non-locked state for a period of time that starts when the operating value becomes a value that falls within a predetermined range based on the lock value and ends when the predetermined operating part is turned off, and to update the lock value with the operating value and switch the non-locked state to the locked state when the predetermined operating part is turned off after having switched to the non-locked state.

2. The receiving apparatus according to claim 1, wherein, when the predetermined operating part is turned on in the locked state, the lock controller is further configured to maintain the locked state for a period of time that starts when the predetermined operating part is turned on and ends when the operating value becomes a value that falls within the predetermined range based on the lock value.

3. The receiving apparatus according to claim 2, wherein, when the predetermined operating part is turned on in the locked state, the lock controller is further configured to display information indicating the locked state for a period of time that starts when the predetermined operating part is turned on and ends when the operating value becomes a value that falls within the predetermined range based on the lock value.

4. The receiving apparatus according to claim 1, wherein the predetermined range based on the lock value ranges from a lock value obtained by subtracting a predetermined first value from the lock value to a lock value obtained by adding a predetermined second value to the lock value.

5. The receiving apparatus according to claim 1, wherein the predetermined range is a range covering values smaller than the lock value.

6. The receiving apparatus according to claim 1, further comprising:
a receiver configured to receive a reception signal including a modulated audio signal and to demodulate the reception signal to thereby generate the audio signal; and
a squelch processor configured to stop outputting the audio by the audio output unit when the reception signal is equal to or lower than a predetermined level or the reception signal does not contain a predetermined control signal, wherein
the predetermined operating part is a monitor key for disabling a function of the squelch processor, and
when the monitor key is turned on, the squelch processor is configured to cause the audio output unit to output the audio regardless of whether the reception signal is present or does not contain the predetermined control signal.

7. The receiving apparatus according to claim 1, wherein the volume controller includes a mechanical operating device.

8. A control method for a receiving apparatus, the receiving apparatus comprising:
an audio output unit configured to output audio corresponding to an audio signal;
a volume operating unit configured to output an operating value indicating a volume level of the audio according to a user operation; and
a volume controller configured to cause the audio output unit to output the audio having a volume level corresponding to the operating value in a non-locked state in which the volume level of the audio can be varied based on the operating value and to cause the audio output unit to output the audio having a volume level corresponding to the lock value in a locked state in which the volume level of the audio is fixed by a constant lock value for the operating value, the control method comprising:
when a predetermined operating part is turned on in the locked state, switching the locked state to the non-locked state for a period of time that starts when the operating value becomes a value that falls within a predetermined range based on the lock value and ends when the predetermined operating part is turned off; and
when the predetermined operating part is turned off after having switched to the non-locked state, updating the lock value with the operating value and switching the non-locked state to the locked state.

* * * * *

UNITED STATES PATENT AND TRADEMARK OFFICE
CERTIFICATE OF CORRECTION

PATENT NO. : 9,804,819 B2
APPLICATION NO. : 15/366261
DATED : October 31, 2017
INVENTOR(S) : Kazuomi Tachigi, Kanji Kuroiwa and Hiroshi Nakamura It is certified that error appears in the above-identified patent and that said Letters Patent is hereby corrected as shown below:

In the Claims

Column 12:
Line 26 replace "the lock value" with "a lock value"

Signed and Sealed this
Second Day of April, 2024

Katherine Kelly Vidal
*Director of the United States Patent and Trademark Office*